United States Patent
Oh

(10) Patent No.: US 11,546,747 B2
(45) Date of Patent: Jan. 3, 2023

(54) SYSTEM AND METHOD FOR PROVIDING PERSONALIZED DISASTER INFORMATION

(71) Applicant: ELECTRONICS AND TELECOMMUNICATIONS RESEARCH INSTITUTE, Daejeon (KR)

(72) Inventor: Seung Hee Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 35 days.

(21) Appl. No.: 17/136,297

(22) Filed: Dec. 29, 2020

(65) Prior Publication Data
US 2021/0211857 A1 Jul. 8, 2021

(30) Foreign Application Priority Data
Jan. 3, 2020 (KR) .................. 10-2020-0000717

(51) Int. Cl.
| | |
|---|---|
| H04W 4/90 | (2018.01) |
| H04W 4/06 | (2009.01) |
| H04W 76/50 | (2018.01) |
| H04W 4/38 | (2018.01) |
| H04W 4/12 | (2009.01) |

(52) U.S. Cl.
CPC .............. *H04W 4/90* (2018.02); *H04W 4/06* (2013.01); *H04W 4/12* (2013.01); *H04W 4/38* (2018.02); *H04W 76/50* (2018.02)

(58) Field of Classification Search
CPC ............................... H04W 4/38; H04W 76/50
See application file for complete search history.

(56) References Cited

U.S. PATENT DOCUMENTS

| | | | |
|---|---|---|---|
| 9,728,052 B2 | 8/2017 | Huh et al. | |
| 2006/0059512 A1* | 3/2006 | Pugel | H04N 5/50 |
| | | | 348/E7.024 |

(Continued)

FOREIGN PATENT DOCUMENTS

| | | |
|---|---|---|
| JP | 2017-199225 A | 11/2017 |
| KR | 10-2017-0022694 A | 3/2017 |
| KR | 10-2000057 B1 | 7/2019 |

OTHER PUBLICATIONS

Soyoung Ahn et al., "A Study on Internet Emergency Alert Distribution System Adaptive to the Receiver Characteristics", JBE vol. 20, No. 4, Jul. 2015.

*Primary Examiner* — Ernest G Tacsik
(74) *Attorney, Agent, or Firm* — LRK Patent Law Firm

(57) ABSTRACT

A method and apparatus for regenerating disaster information by adding information on an actual situation of a personal interest area to basic disaster information. In order to generate disaster information that meets interests of various individuals, the disclosure suggests a method for collecting and managing information on an interest area of an individual in advance, and collecting, analyzing and managing information measured by various measurers and sensors installed in the interest area. When a serious or urgent disaster occurs or is predicted and disaster information is provided, information collected in an interest area of an individual is combined with basic disaster information to transmit personalized disaster information.

12 Claims, 4 Drawing Sheets

(56) References Cited

U.S. PATENT DOCUMENTS

2012/0185897 A1* 7/2012 Gould ................ H04N 21/8146
　　　　　　　　　　　　　　　　　　　　725/33
2014/0087683 A1　3/2014 Lim et al.
2014/0269465 A1* 9/2014 Ballantyne .............. H04W 4/06
　　　　　　　　　　　　　　　　　　　　370/312
2014/0368341 A1* 12/2014 Williams ............. G08B 27/005
　　　　　　　　　　　　　　　　　　　　702/3

* cited by examiner

FIG. 3

[MINISTRY OF PUBLIC ADMINISTRATION & SECURITY]
HEAVY RAIN WARNING & LANDSLIDE OCCURRENCE IN JEJU
◆ NOTICE OF HEAVY RAIN WARNING IN JEJU
◆ 19:30 ON AUGUST 24

(a)

[MINISTRY OF PUBLIC ADMINISTRATION & SECURITY]
HEAVY RAIN WARNING & LANDSLIDE OCCURRENCE IN JEJU
◆ NOTICE OF LANDSLIDE DANGER TO XX ELEMENTARY SCHOOL IN JEJU
◆ 19:30 ON AUGUST 24

(b)

SYSTEM AND METHOD FOR PROVIDING PERSONALIZED DISASTER INFORMATION

CROSS-REFERENCE TO RELATED APPLICATION(S)

This application claims the benefit of Korean Patent Application No. 10-2020-0000717, filed on 3 Jan. 2020, in the Korean Intellectual Property Office, the disclosure of which is incorporated herein in its entirety by reference.

BACKGROUND

1. Field of the Invention

The disclosure relates to a technology for providing disaster information to a personal terminal by using mobile communication.

2. Description of Related Art

When natural disasters such as typhoons, earthquakes, viruses or the like, and social disasters such as fine dusts, forest fires, massive fires or the like occur or are predicted, a government or local government classify, in order to ensure the security of the public, a disaster situation into an urgent situation, a serious situation, and a safe situation, and transmit a disaster warning message and disaster information to the public via various media such as mobile communication, DMB, terrestrial broadcasting or the like.

However, the disaster warning massage that is currently transmitted to an individual via mobile communication is transmitted in the same form. Accordingly, many people tend to consider it uncomfortable or unnecessary even though it is the fastest medium for transmitting disaster information to an individual.

The related art, which relates to a technology for transmitting disaster information to an individual via mobile communication continuously and repeatedly provides fragmented disaster information, resulting in a reduction in the importance of the disaster information and an increase in public insensitivity to safety.

In this regard, a technology has been developed for analyzing a situational characteristic of an individual to provide personalized disaster information, however, that technology merely classifies an individual into old person, disabled person, foreign person and the like and takes location-related characteristic information into consideration, and does not include a content regarding a personal interest.

SUMMARY

In transmitting disaster information to an individual, the present disclosure suggests a method for providing personalized disaster information that is based on basic core disaster information and is combined with additional information to meet personal needs, so as to increase the utilization and interest of disaster information.

In order to solve the above-described issue, the disclosure provides a method and apparatus for generating personalized disaster information by adding information on a personal interest that may be received from various pre-installed IoT devices to existing disaster information (that is, basic core information on a disaster) and thereafter for providing the personalized disaster information to an individual. Here, the added information about the personal interest may be provided from various sensors, IoT devices, and the like built by government-related organizations and local government-related organizations in a personal interest area (for example, a school, a hospital, a multi-dense facility, or the like).

For example, when a fine dust index is high, a related disaster information text message may be received; however, parents with school-age children living in a specific city are most interested in information on fine dust around a specific elementary school located in this city. Therefore, it is possible to provide, to parents, information on fine dust measuring device installed in this elementary school in addition to basic information on fine dust, thereby increasing an interest in disaster information and supporting the parents to respond to fine dust.

The disaster information provided to the public to date includes almost the same information according to a disaster type, and thus many people are responding to the disaster information with increasing indifference despite the fact that the disaster information is important information. Therefore, when disaster information is provided individually via a mobile phone or DMB even through a case is excluded where disaster information is provided to a majority of people via a broadcast, the disclosure provides, so as to increase the importance and interest of the disaster information, a method and system for providing disaster information including personalized additional information.

Specifically, according to one aspect of the disclosure, there is provided a system for providing personalized disaster information including a disaster information regeneration server configured to receive basic disaster information transmitted from a disaster information issuing source, and combine the basic disaster information with measurement information associated with a personal interest to regenerate personalized disaster information specific to the personal interest and provide the personalized disaster information to a personal terminal.

When the basic disaster information is not issued, the disaster information regeneration server may collect a personal interest in advance, and may collect measurement information associated with the personal interest in advance.

According to another aspect of the disclosure, there is provided an apparatus for regenerating disaster information including a unit configured to collect, store, and manage a personal interest for each individual user, a unit configured to collect measurement information associated with each personal interest, a unit configured to match associated measurement information to a personal interest by receiving basic disaster information issued by an issuing source and analyzing the personal interest, a unit configured to generate personalized disaster information by combining the matched measurement information with the basic disaster information, and a unit configured to transmit the generated personalized disaster information to a personal terminal.

According to still another aspect of the disclosure, there is provided a method of providing personalized disaster information, the method comprising: receiving basic disaster information transmitted from a disaster information issuing source, combining measurement information associated with a personal interest with the basic disaster information, regenerating personalized disaster information specific to the personal interest, and providing the personalized disaster information to a personal terminal.

Specifically, the method may include collecting, storing, and managing a personal interest for each individual user, collecting measurement information associated with each personal interest, matching associated measurement information to a personal interest by receiving basic disaster information issued by an issuing source and analyzing the personal interest, generating personalized disaster information by combining the matched measurement information with the basic disaster information, and transmitting the generated personalized disaster information to a personal terminal.

The spirit of the disclosure as introduced above will become apparent from the following detailed description of the embodiments taken in conjunction with the drawings.

The aspects of the disclosure may provide personalized disaster information generated based on levels of personal interests and situational characteristics of individuals, thereby increasing a level of an interest in disaster information provided by a government or local government, and further supporting a quick and efficient response to a disaster. As a result, it may be expected to have an effect of ultimately reducing human, physical, social and environmental damages caused by the disaster through a rapid preparation and response to the disaster and reducing to an economic cost required for disaster recovery.

BRIEF DESCRIPTION OF THE DRAWINGS

FIG. 3 illustrates examples of a basic disaster information message and a personalized disaster information message;

DETAILED DESCRIPTION

Advantages and features of the disclosure, and a method for achieving them will become apparent with reference to preferred embodiments described in detail with reference to the accompanying drawings. However, the disclosure is not limited to the embodiments described below and may be implemented in various other forms. The embodiments are merely provided to completely disclose the disclosure and to fully inform those skilled in the art to which the disclosure belongs of the scope of the disclosure, and the disclosure is defined by appended claims. In addition, terms used in the specification are considered in a descriptive sense only, and not for purposes of limitation. The terminology used herein is used for the purpose of describing particular embodiments only and is not intended to be limiting. It must be noted that as used herein and in the appended claims, the singular forms "a," "an," and "the" include the plural references unless the context clearly dictates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or a combination thereof. Furthermore, these terms such as "first," "second," and other numerical terms, are used only to distinguish one element from another element. These terms are generally only used to distinguish one element from another.

Hereinafter, preferred embodiments of the disclosure will be described in detail with reference to the accompanying drawings. In the description of embodiments of the disclosure, detailed description of well-known related structures or functions will be omitted when it is deemed that such description will obscure the gist of the disclosure.

Figure 1:
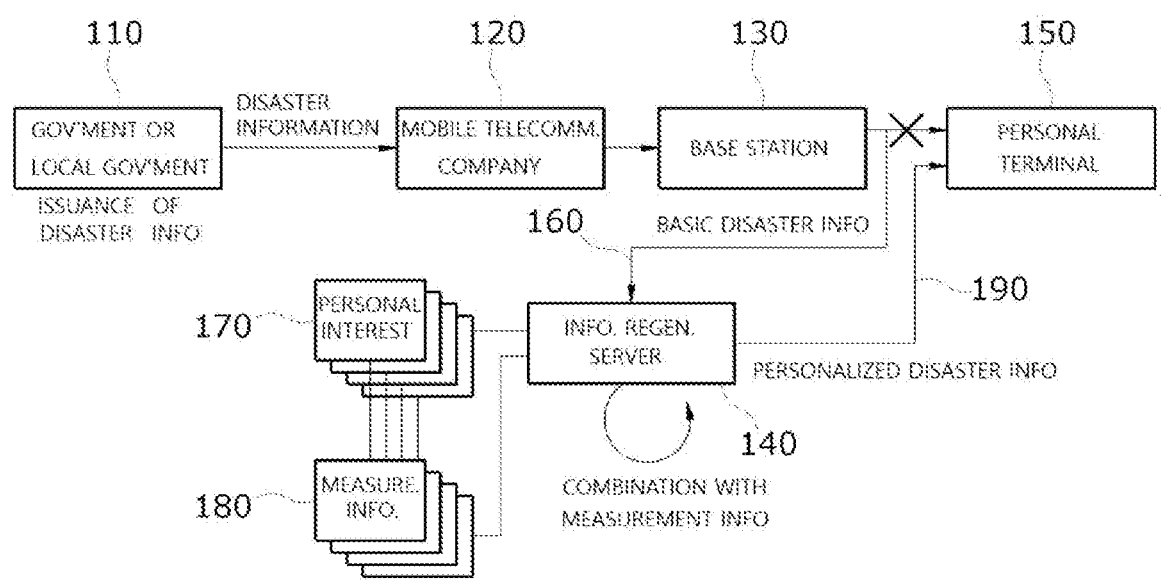
FIG. 1 is a conceptual diagram of a personalized disaster information providing system according to the disclosure.

FIG. 1 illustrates a concept of a personalized disaster information providing system according to the disclosure. A concept is illustrated in which "basic disaster information" 160 is transmitted to an information regeneration (reproduction) server 140 from a base station 130, and "measurement information" 180 associated with "personal interest" 170 is additionally combined with the basic disaster information 160 to regenerate "personalized disaster information" 190 specific to the personal interest 170, and provide the personalized disaster information 190 to a personal terminal 150, out of a conventional method in which disaster information issued by a government or local government 110 is transmitted from a mobile telecommunication company 120 to the personal terminal 150 via the base station 130.

The disaster information regeneration server 140 may collect and manage the personal interest 170 in advance with personal consent at a normal time, that is, when the disaster information is not issued. A method for collecting the personal interest 170 may utilize a previously known method. In addition, the disaster information regeneration server 140 may collect the measurement information 180 measured by a measurer or a sensor associated with each personal interest 170 at a normal time.

As described above, when the disaster information generated by the government or local government 110 is transmitted to the mobile telecommunication company 120, the previously known method had a structure of transmitting the disaster information from the base station 130 of the mobile telecommunication company to the personal terminal 150 such as a mobile phone or the like. Through this way, uniform disaster information generated in units of a city, a county, and a district was transmitted to an individual, and thus there existed shortcoming in that a disaster information receiver person considered the importance of the received information to be increasingly low or responded to the received disaster information indifferently especially when the received disaster information was repeatedly transmitted.

The disclosure provides an apparatus and method for enhancing utilization and usability of the disaster information by adding the measurement information 180 corresponding to the personal interest 170 collected and managed by the disaster information regeneration server 140 to the initially transmitted basic disaster information 160, instead of transmitting the disaster information directly from the base station 130 of the mobile telecommunication company to the personal terminal 150 to generate the personalized disaster information 190 and transmit the personalized disaster information 190 to the personal terminal 150.

The personal interest 170 described herein may refer to a region, area, institution, or the like that an individual is interested in, but is not limited thereto. In addition, the measurement information 180 corresponding to the personal interest 170 may refer to information measured by an installed sensor or measurer associated with the personal interest 170.

Figure 2:
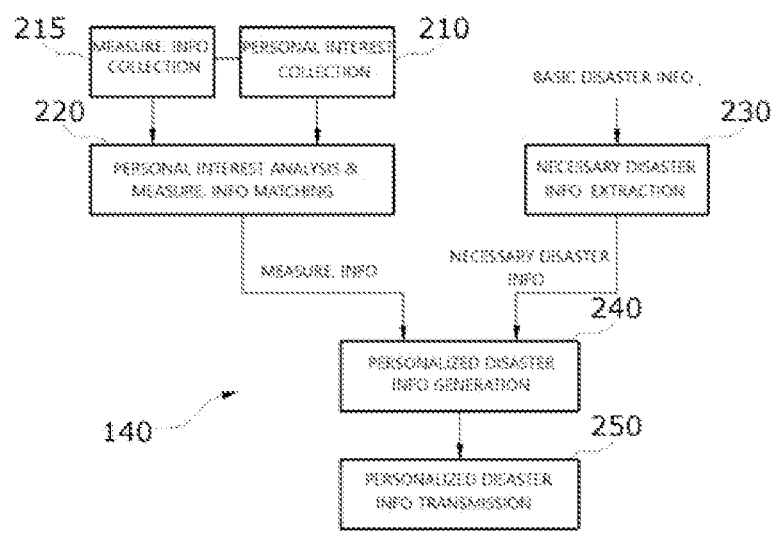
FIG. 2 is a configuration diagram of the disaster information regeneration server 140 illustrated in FIG. 1.

FIG. 2 is a configuration diagram of the disaster information regeneration server 140 of the personalized disaster information providing system of the disclosure illustrated in FIG. 1.

The disaster information regeneration server 140 may include a unit 210 configured to collect, store, and manage the personal interest 170 for each individual user, a unit 215 configured to collect the measurement information 180 associated with each personal interest 170, a unit 220 configured to match associated measurement information to each personal interest by analyzing the personal interest when disaster information issued by a government or local government is transmitted via a base station of a mobile telecommunication company, a unit 230 configured to extract "necessary disaster information" having a content necessary to be provided to the personal terminal 150 by analyzing "basic disaster information" transmitted via the base station of the mobile telecommunication company, a unit 240 configured to generate "personalized disaster information" by combining the measurement information outputted from the units 220 and 230 with the necessary disaster information, and a unit 250 configured to transmit the generated personalized disaster information to a personal terminal.

Here, the personal interest collection unit 210 and the measurement information collection unit 215 may be constantly performed, and the personal interest analysis and measurement information matching unit 220, the necessary disaster information extraction unit 230, the personalized disaster information generation unit 240, and the personalized disaster information transmission unit 250 may be performed when the disaster information is transmitted from the base station.

Hereinafter, each component is described below.

The personal interest collection unit 210 may collect, store, and manage a personal interest for each individual in advance with personal consent.

The measurement information collection unit 215 may collect measurement information corresponding to each personal interest. To this end, it may be necessary to collect information (e.g., information on temperature, humidity, fine dust, noise, earthquake intensity, carbon dioxide, or other various gases and pollutions) measured by a measurer or sensor (including an IoT sensor) associated with each personal interest (for example, an interest area such as a school, a hospital, a multi-dense facility, or the like).

The personal interest analysis and measurement information matching unit 220 may collect and store, at a normal time, information measured by the measurer or sensor (including the IoT sensor) associated with the personal interest. When the disaster information is issued, the unit 220 may analyze the personal interest collected and managed by the personal interest collection and storage unit 210 for each individual user to match corresponding measurement information to each personal interest.

The necessary disaster information extraction unit 230 may extract disaster information having a content necessary to be transmitted to an individual by receiving the basic disaster information issued by the government or local government from the base station 130 of the mobile telecommunication company 120, and classifying the disaster information according to items such as a disaster type, a disaster area, a disaster start date and time, and an urgent level of a disaster, and may output the extracted necessary disaster information.

The necessary disaster information extraction unit 230 may be an optional element. That is, the personalized disaster information generation unit 240 may generate personalized disaster information by using the basic disaster information issued by the government or local government as it is.

The personalized disaster information generation unit 240 may generate personalized disaster information by combining the measurement information outputted from the personal interest analysis and measurement information matching unit 220 with the necessary disaster information outputted by the necessary disaster information extraction unit 230 (or with the basic disaster information issued by the government or local government). In this case, a plurality of pieces of personalized disaster information may be generated as necessary according to the personal interest. To this end, the personal interest collection and storage unit 210 may need to diversify and collect the user's personal interest into various types or categories with the user's consent.

The personalized disaster information transmission unit 250 may perform user authentication, disaster information encryption, reliable communication functions, and the like so as to securely transmit one or more pieces of the regenerated disaster information received from the personalized disaster information generation unit 240 to a corresponding individual.

FIG. 3 illustrates examples of a content of basic disaster information and a content of personalized disaster information.

(a) is a message having a content of basic disaster information issued by the government or local government, the message including "Heavy rain warning and landslide occurrence in Jeju". (b) is a personalized disaster information message including "Landslide danger to XX elementary school in Jeju" generated by combining a personal interest (in this example, XX elementary school in Jeju) and measurement information associated with the personal interest with the basic disaster information.

Figure 4:
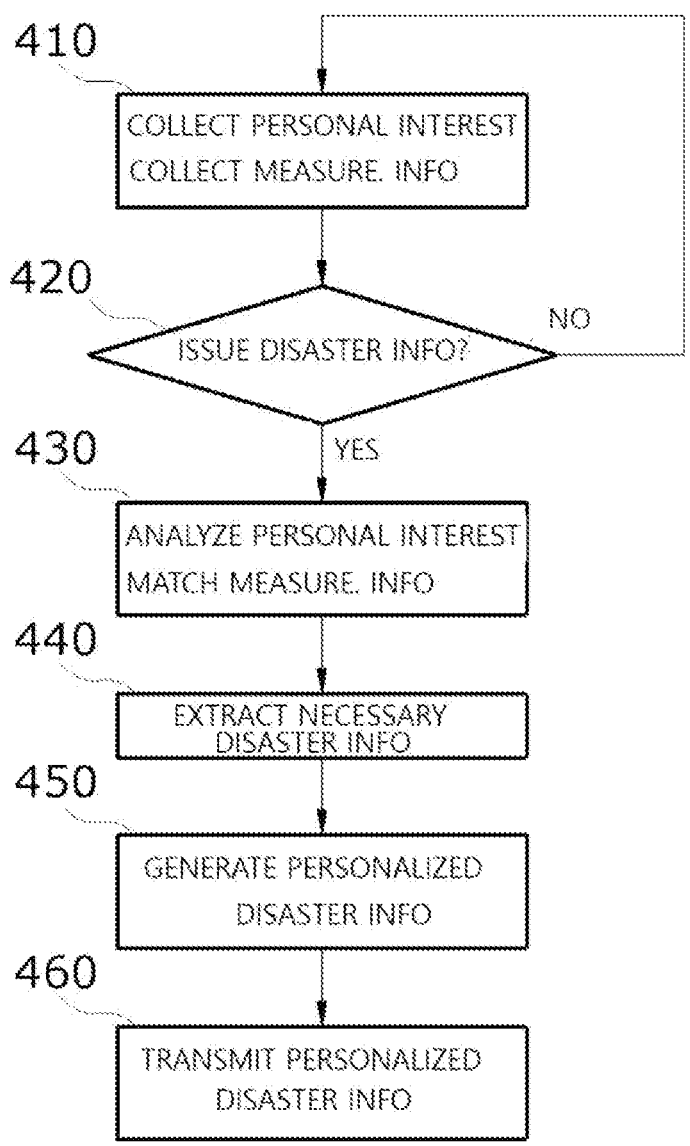
FIG. 4 is a flowchart of functions performed by a personalized disaster information providing system according to the disclosure.

FIG. 4 is a flowchart of functions performed by the above-described personalized disaster information providing system according to the disclosure. The flowchart of FIG. 4 may be substantially similar to task processes performed by the disaster information regeneration server 140 of FIG. 2.

410: At a normal time, that is, as long as disaster information issued by a government or local government is not transmitted via a base station of a mobile telecommunication company, the disaster information regeneration server 140 may collect a personal interest for each individual user, and may collect, store, and manage measurement information associated with each personal interest.

420: Whether the disaster information issued by the government or local government is transmitted via the base station of the mobile telecommunication company may be checked.

430: The personal interest collected for each individual user may be analyzed to match associated measurement information to each personal interest.

440: The basic disaster information issued by the government or local government may be received and classified according to items such as a disaster type, a disaster area, a disaster start date and time, and an urgent level of a disaster to extract necessary disaster information having a content necessary to be transmitted to an individual and output the extracted necessary disaster information. This step is an optional, which means it is also possible to generate personalized disaster information in a subsequent step by using the basic disaster information issued by the government or local government as it is.

450: The measurement information matched to the analyzed personal interest may be combined with the extracted disaster information (or with the basic disaster information issued by the government or local government) to generate personalized disaster information. In this case, a plurality of pieces of personalized disaster information may be generated as necessary according to the personal interest.

460: The generated personalized disaster information may be transmitted to the individual. In this case, in order to securely transmit the generated personalized disaster information, user authentication, disaster information encryption, reliable communication functions, and the like may be performed.

As described above, the disclosure may be implemented in an apparatus aspect or a method aspect. In particular, a function or process of each element of the disclosure may be implemented by at least one of a digital signal processor (DSP), a processor, a controller, an application-specific IC (ASIC), a programmable logic element (such as a field programmable gate array (FPGA)), and other electronic devices, or by a hardware element including a combination thereof. Alternatively, the function or process may be implemented by software in combination or independently of the hardware element, and the software may be stored on a recording medium.

It should be understood by those skilled in the art that, although the disclosure has been described in detail with reference to embodiments, various changes in form and details may be made therein without departing from the technical spirit and essential features of the disclosure as defined by the appended claims. Therefore, the above embodiments are to be regarded as illustrative rather than restrictive. The protective scope of the disclosure is defined by the following claims rather than the detailed description, and all changes or modifications derived from the claims and their equivalents should be interpreted as being encompassed in the technical scope of the disclosure.

What is claimed is:

1. A system for providing personalized disaster information comprising:
    a disaster information regeneration server configured to receive basic disaster information from a base station of a mobile telecommunication company issued by a disaster information issuing source,
    wherein the disaster information regeneration server is configured to combine the basic disaster information with measurement information associated with a personal interest to generate personalized disaster information specific to the personal interest and provide the personalized disaster information to a personal terminal,
    wherein the disaster information regeneration server comprises a plurality of units which are executed by a processor which is connected to a storage unit, the units comprising:
    a unit configured to collect, store, and manage, both when the basic disaster information is not issued by the disaster information issuing source and when the basic disaster information is received from the base station of the mobile telecommunications company issued by the disaster information issuing source, a personal interest for each individual user including disaster type information and disaster area information;
    a unit configured to collect, store and manage both when the basic disaster information is not issued by the disaster information issuing source and when the basic disaster information is received from the base station of the mobile telecommunications company issued by the disaster information issuing source, measurement information associated with each personal interest of each individual user;
    a unit configured to match, when the basic disaster information is received from the base station of the mobile telecommunications company issued by the disaster information issuing source, measurement information associated with the personal interest of each individual user to the personal interest for each individual user;
    a unit configured to extract, when the basic disaster information is received from the base station of the mobile telecommunication company issued by the disaster information issuing source, necessary disaster information having a content necessary to be provided to the personal terminal based on the matching measurement information associated with the personal interest of each individual user;
    a unit configured to generate, when the basic disaster information is received from the base station of the mobile telecommunication company issued by the disaster information issuing source, personalized disaster information by combining the measurement information with the necessary disaster information; and
    a unit configured to transmit, when the basic disaster information is received from the base station of the mobile telecommunication company issued by the disaster information issuing source, the generated personalized disaster information to the personal terminal,
    wherein the generated personalized disaster information further includes the disaster information issuing source.

2. The system of claim 1, wherein the measurement information comprises information measured by a measurer or a sensor associated with the personal interest of each individual user.

3. The system of claim 1, wherein the necessary disaster information extraction unit is configured to extract basic disaster information having a content necessary to be transmitted to the personal terminal by receiving and classifying the basic disaster information according to at least one item of a disaster start date and time, and an urgent level of a disaster.

4. The system of claim 1, wherein one or more pieces of the personalized disaster information are generated for each individual user.

5. An apparatus for regenerating disaster information, which receives basic disaster information from a base station of a mobile telecommunication company issued by a disaster information issuing source, combines measurement information associated with a personal interest with the basic disaster information, generates personalized disaster information specific to the personal interest, and provides the personalized disaster information to a personal terminal, the apparatus comprising:
    a server comprises a plurality of units which are executed by a processor which is connected to a storage unit, the units comprising:
    a unit configured to collect, store, and manage, both when the basic disaster information is not issued by the disaster information issuing source and when the basic disaster information is received from the base station of the mobile telecommunications company issued by the disaster information issuing source, a personal interest for each individual user including disaster type information and disaster area information;
    a unit configured to collect, store and manage both when the basic disaster information is not issued by the disaster information issuing source and when the disaster information is received from the base station of the mobile telecommunication company issued by the disaster information issuing source, measurement information associated with each personal interest of each individual user;

a unit configured to match, when the basic disaster information is received from the base station of the mobile telecommunication company issued by the disaster information issuing source, measurement information associated with the personal interest of each individual user to the personal interest for each individual user;

a unit configured to generate, when the basic disaster information is received from the base station of the mobile telecommunication company issued by the disaster information issuing source, personalized disaster information by combining the matched measurement information with the basic disaster information;

a unit configured to transmit, when the basic disaster information is received from the base station of the mobile telecommunication company issued by the disaster information issuing source, the generated personalized disaster information to the personal terminal; and a unit configured to extract, when the basic disaster information is received from the base station of the mobile telecommunication company issued by the disaster information issuing source, necessary disaster information having a content necessary to be provided to the personal terminal by analyzing the basic disaster information according to at least the disaster type information and the disaster area information, wherein the measurement information is combined with the necessary disaster information to generate personalized disaster information, wherein the generated personalized disaster information further includes the disaster information issuing source.

6. The apparatus of claim 5, wherein the measurement information comprises information measured by a measurer or a sensor associated with the personal interest of each individual user.

7. The apparatus of claim 5, wherein the necessary disaster information extraction unit is configured to extract disaster information having a content necessary to be transmitted to the personal terminal by receiving and classifying the basic disaster information according to at least one item of a disaster start date and time, and an urgent level of a disaster.

8. The apparatus of claim 5, wherein one or more pieces of the personalized disaster information are generated for each individual user.

9. A method of providing personalized disaster information, which receives basic disaster information from a base station of a mobile telecommunication company issued by a disaster information issuing source, combines measurement information associated with a personal interest with the basic disaster information, generates personalized disaster information specific to the personal interest, and provides the personalized disaster information to a personal terminal, the method comprising:

collecting, storing, and managing, both when the basic disaster information is not issued by the disaster information issuing source and when the basic disaster information is received from the base station of the mobile telecommunication company issued by the disaster information issuing source, a personal interest for each individual user including disaster type information and disaster information;

collecting, storing and managing both when the basic disaster information is not issued by the disaster information issuing source and when the basic disaster information is received from the base station of the mobile telecommunication company issued by the disaster information issuing source, measurement information associated with each personal interest of each individual user;

matching, when the basic disaster information is received from the base station of the mobile telecommunication company issued by the disaster information issuing source, measurement information associated with the personal interest of each individual user to the personal interest for each individual user;

generating, when the basic disaster information is received from the base station of the mobile telecommunication company issued by the disaster information issuing source, personalized disaster information by combining the matched measurement information with the basic disaster information;

transmitting, when the basic disaster information is received from the base station of the mobile telecommunication company issued by the disaster information issuing source, the generated personalized disaster information to the personal terminal; and extracting, when the basic disaster information is received from the base station of the mobile telecommunication company issued by the disaster information issuing source, necessary disaster information having a content necessary to be provided to the personal terminal by analyzing the basic disaster information according to at least the disaster type information and the disaster area information, wherein the measurement information is combined with the necessary disaster information to generate personalized disaster information, wherein the generated personalized disaster information further includes the disaster information issuing source.

10. The method of claim 9, wherein the measurement information comprises information measured by a measurer or a sensor associated with the personal interest of each individual user.

11. The method of claim 9, wherein the extracting of the necessary disaster information comprises extracting disaster information having a content necessary to be transmitted to the personal terminal by receiving and classifying the basic disaster information according to at least one item of a disaster start date and time, and an urgent level of a disaster.

12. The method of claim 9, wherein one or more pieces of the personalized disaster information are generated for each individual user.

* * * * *